United States Patent [19]

Nishida

[11] Patent Number: 5,067,165
[45] Date of Patent: Nov. 19, 1991

[54] CHARACTER RECOGNITION METHOD

[75] Inventor: Hirobumi Nishida, Sagamihara, Japan

[73] Assignee: Ricoh Company, Ltd., Japan

[21] Appl. No.: 508,727

[22] Filed: Apr. 16, 1990

[30] Foreign Application Priority Data

| Apr. 19, 1989 | [JP] | Japan | 1-99575 |
| Apr. 19, 1989 | [JP] | Japan | 1-99576 |
| Feb. 21, 1990 | [JP] | Japan | 2-40498 |

[51] Int. Cl.$^5$ ............................................. G06K 9/46
[52] U.S. Cl. ........................................ 382/19; 382/34; 382/37; 382/40
[58] Field of Search .................. 382/40, 19, 25, 34, 382/37

[56] References Cited

U.S. PATENT DOCUMENTS 4,754,489  6/1988  Bokser ................................. 382/40

OTHER PUBLICATIONS

Young et al. "*Handbook of Pattern Recognition and Image Processing*", Academic Press, 1986, pp. 85–117.

Primary Examiner—Leo H. Boudreau
Attorney, Agent, or Firm—Mason, Fenwick & Lawrence

[57] ABSTRACT

A method for recognizing a character string made of alphanumeric characters comprises processes of providing a dictionary storing each alphanumeric character in a form of a graph including nodes and links, each of the nodes corresponding to the structural elements of the character and carrying an attribute representing thereof, each of the links representing the geometrical relationship which exists between the nodes connected by the link, extracting the structural elements together with the geometrical relationship existing therebetween from the character string read from the document starting from a starting location at one end of the character string, verifying that a corresponding structural element and geometrical relationship exist in the dictionary, predicting the structural elements and the geometrical relationship existing in the character string at a location immediately adjacent to the former location in the character string, based on the result of verification, and recognizing the character string by moving the location step by step consecutively along the character string towards the second end.

5 Claims, 6 Drawing Sheets

FIG. 5
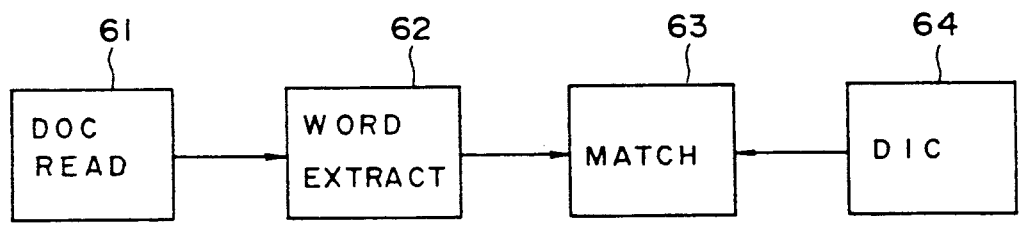
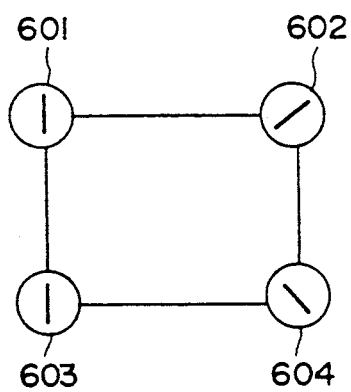
FIG. 6(A)
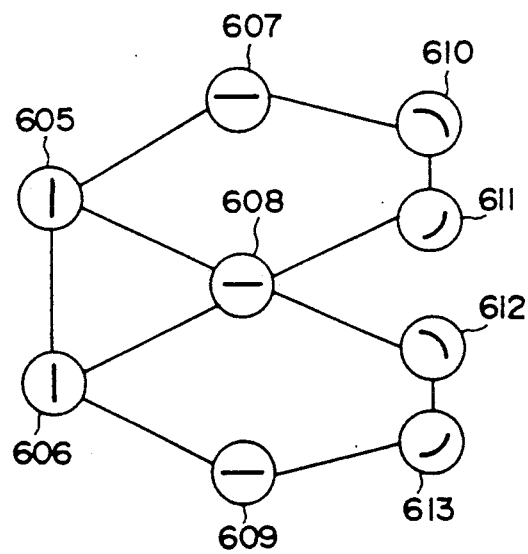
FIG. 6(B)

FIG. 8
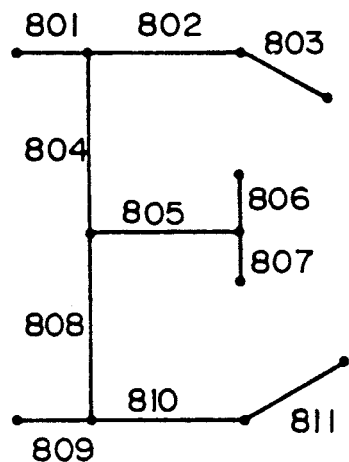
FIG. 9
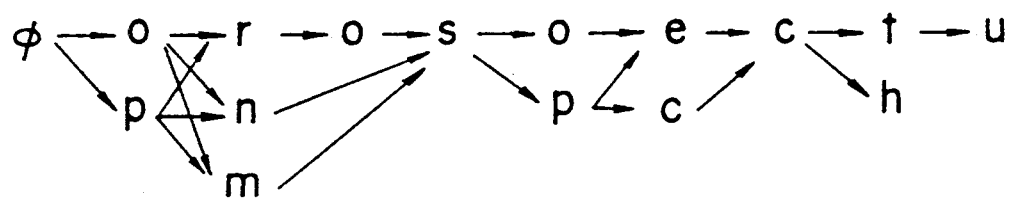
FIG. 10

CHARACTER RECOGNITION METHOD

BACKGROUND OF THE INVENTION

The present invention generally relates to recognition of characters and more particularly to a method for recognizing alphanumeric characters printed or handwritten on a sheet.

Conventionally, recognition of alphanumeric characters printed on a sheet is made by extracting a feature of the characters which changes little with respect to the statistical distribution or with respect to the moment of the character. For example, Kahan et al. describes a method of character recognition using the statistical distribution of the skeleton line of a character (Kahan, S., Pavlidis, T., Baird H. S. *IEEE Transactions on Pattern Analysis and Machine Intelligence* vol.PAMI-9, pp.274–288, March 1987). On the other hand, Cash et al. describes a method of character recognition using the moment (Cash, G. L. and Hatamian, M. *Computer Vision, Graphics and Image Processing* vol.39, pp.291–310, 1987).

In any of the foregoing methods, the recognition of characters is made on the basis of the feature extracted from the character, after segmenting the characters read from the sheet into individual characters. In the actual documents, there occurs rather frequently a case in which adjacent characters contact or overlap each other. Therefore, the foregoing methods are often ineffective for recognizing the characters on the actual document. In order to handle such a case, empirical processes had to be used. For example, Kahan et al. proposes to distinguish the processes of recognizing the characters in the case of the so-called "serif-join" wherein the characters contact each other at the end of the serif and in the case of the so-called "double-join" wherein convex contours of the characters overlap each other. According to this process, when it is recognized that there exists a character image which does not belong to any of the characters after the process of the first segmentation, a perspective histogram analysis of the character image is applied for segmentation of the character. However, this process is generally not successful for the actual documents, and thus, there exists a serious problem with respect to the segmentation of alphanumeric characters.

In order to eliminate this problem of segmentation, Japanese Patent Publication No. 58-47064 proposes a method wherein a character string is scanned by a slit from the left to extract the feature of the character. In this method, a self-correlation analysis is applied to the feature thus extracted in order to recognize the character. However, this approach has a problem which is pertinent to the self-correlation analysis in that detailed information on the character tends to be lost.

SUMMARY OF THE INVENTION

Accordingly, it is a general object of the present invention to provide a novel and useful character recognition method, wherein the foregoing problems are eliminated.

Another object of the present invention is to provide a character recognition method wherein the necessity of segmentation of the characters at the time of character recognition is eliminated. The foregoing object is achieved by segmenting a character image read from a document into words, and the recognition of a character is performed sequentially from the left or from the right for each of the words. According to the present invention, the necessity of segmenting each character from the word is eliminated and the recognition of the character string is made for each word, starting from the left or right of the word. As a result of elimination of the segmentation of the individual characters from the word, the present invention is effective even when the characters are contacted with each other in the document.

Another object of the present invention is to provide a character recognition method wherein the process for discriminating characters having a similar appearance is simplified, and at the same time to provide a method which is effective for the recognition of characters including a substantial amount of noise. The foregoing object is achieved by providing a dictionary for storing a first type information which comprises one or more structural elements of characters characterizing a difference between structurally related characters and a second type information which comprises one or more structural elements of characters which is included commonly in the structurally related characters, and by matching the characters, for the character string read from the document, with respect to the characters stored in the dictionary. According to the present invention, the process for distinguishing characters having a similar appearance can be simplified by the use of the the dictionary. Even when there are characters having a similar appearance, the distinction therebetween can be made by simply referring to the dictionary for further details of the features of the characters. Thus, the process of recognition of characters can be simplified. As a result of the use of matching with respect to the features of the structural elements forming the characters, the present invention can be effectively applied to the characters of various fonts or characters having various modifications. Further, the method of the present invention is effective particularly when the characters include a substantial amount of noise.

Another object of the present invention is to provide a character recognition method for recognizing characters in a character string read from a document without segmenting the characters, comprising steps of extracting structural elements forming alphanumeric characters together with attributes thereof such as lines, arcs and isolated points and the like, storing the structural elements in a dictionary together with the positional relationship between the structural elements for each of the characters, reading the character string from the document, identifying the characters in the character string consecutively while referring to the dictionary, starting from the left of the character string and proceeding consecutively to the right of the character string. According to the present invention, recognition of a character is performed with reliability even when the characters contact each other in the string or even when the characters have the serif which tends to cause the characters to contact. Further, the recognition of the character is made without ignoring the detailed structural features of the character. Furthermore, as the attributes attached to the nodes or to the links are the quantities of stochastic nature, the recognition of the character according to the present invention is effective even when the font of the character is variously modified.

Another object of the present invention is to provide a character recognition method, comprising a step of forming a directed network comprising nodes and directed links, each of the nodes of the directed network comprising the relational graphs which in turn include the structural elements forming the characters and the positional relationship between the structural elements as the nodes and the links of the relational graphs, the nodes of the directed network being arranged in the network in a predetermined order such that a node of the directed network, which is connected by the directed link to another node from which the directed link is originating, includes the entire relational graph pertinent to the foregoing other node, and another step of matching the relational graphs according to the predetermined order. More specifically, the difference between two characters which are related to each other by sharing a common structural element is represented by the directed link which extends to the node which includes all the structural elements of the former node. Using this directed network, the characters are arranged in an order such that a most fundamental character which is included in many other characters is placed at an upstream position in the directed network while the most complex character including the features of many other characters is placed at a downstream end of the directed network. The recognition of the observed character string by matching it with the relational graph is started from the character at the upstream end of the network and proceeds to the characters at the downstream end. According to the present invention, the character recognition can be performed with efficiency. It should be noted that the present method reduces the load of calculation by eliminating unnecessary process by performing the matching process while tracing the structural feature which is commonly included in various characters, starting from a simple character and proceeding towards a complex character.

Another object of the present invention is to provide a character recognition method wherein the problem of numerous candidate strings being formed in response to the recognition of a given character string is avoided and the time needed to complete the character recognition is substantially reduced. It should be noted that in the present invention, the recognition of one character is influenced by the character previously recognized. Therefore, the recognition of the character is made actually as a recognition of the character string. The foregoing object is achieved by calculating a loss function or alternatively a pay-off function each time the recognition of the character proceeds to the right in the given character string such that the loss function or the pay-off function calculated, regarding the progress of the character recognition from one character to the next as a transition of state, is minimized. As a result, generation of a candidate character string having an inappropriate loss function or pay-off function is eliminated and the efficiency of the character recognition is improved.

Other objects and further features of the present invention will become apparent from the following detailed description when read in conjunction with the attached drawings.

BRIEF DESCRIPTION OF THE DRAWINGS

FIG. 5 is a diagram showing a system of character recognition which performs the character recognition process according to a second embodiment of the present invention;

FIGS. 6A and 6B are diagrams showing an example of a relational graph used for describing the character;

FIG. 8 is a diagram showing an example of a character formed by lines;

FIG. 9 is a diagram showing an example of a character string;

FIG. 10 is a diagram showing the transition of states during the character recognition process applied to the character string of FIG. 9.

DETAILED DESCRIPTION

Next, a first embodiment of the present invention will be described with reference to FIGS. 1 through 4.

Figure 1:
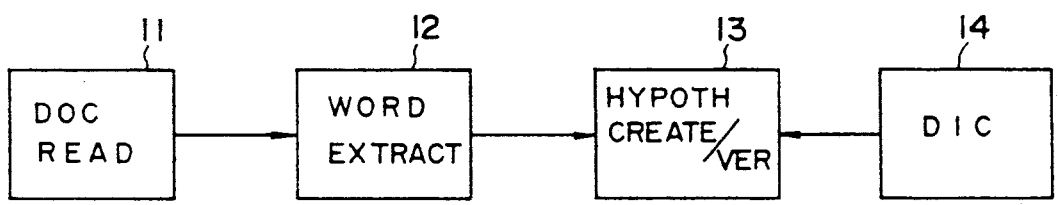
FIG. 1 is a block diagram showing a system of character recognition which performs the character recognition process according to a first embodiment of the present invention.

Referring to FIG. 1 showing the process of character recognition according to the first embodiment, alphanumeric characters printed on a document are read by a scanner 11 and the like, and a binary image data indicative of the characters on the document is produced. The binary image data is supplied to a word recognition unit 12 where each word is segmented from the binary image data on the basis of evaluation of the vertical projection, and a feature of the characters forming the word is extracted as an assembly of lines which characterize the characters in the word.

Next, the feature is supplied to a hypothesis creation and verification unit 13 where candidate characters having the extracted feature are produced. The unit 13 is further supplied with a data representing the features of various characters from a dictionary 14, and the validity of the predicted character is verified on the basis of a comparison with the actually observed feature and the feature supplied from the dictionary 14. It should be noted that the dictionary 14 stores the features of the characters as a relational graph representing the differences and similarlities of the features for a number of characters.

Figure 2:
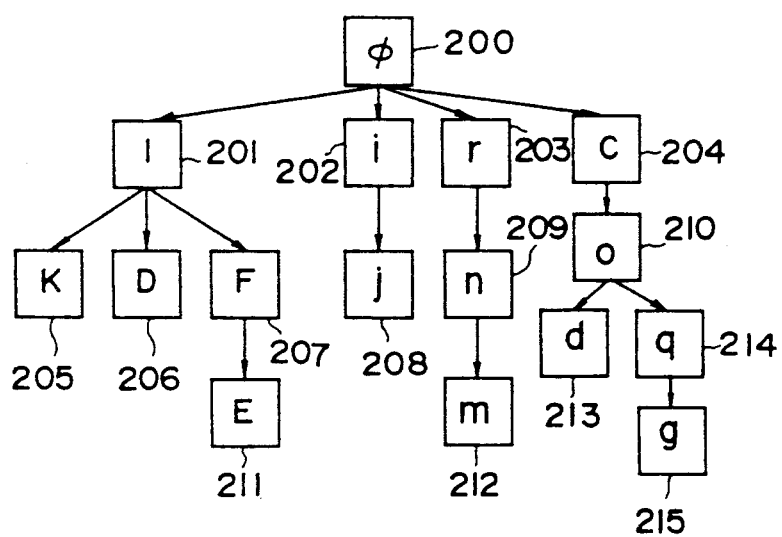
FIG. 2 is a diagram showing an example of a dictionary used in the process of FIG. 1 for storing the various alphanumeric characters.

FIG. 2 shows an example of the content stored in the dictionary 14. Referring to FIG. 2, the characters are represented as a directed graph comprising a plurality of nodes 200–215 and corresponding links connecting the nodes, wherein each of the nodes carries a label indicating the feature of the character corresponding to the node. Generally, the nodes $N_1$ and $N_2$ are linked by the directed link as $$N_1 \rightarrow N_2$$

only when the character corresponding to the node $N_1$ forms a part of the character corresponding to the node $N_2$. The node 200 at the origin of the graph is called a root.

Figure 3:
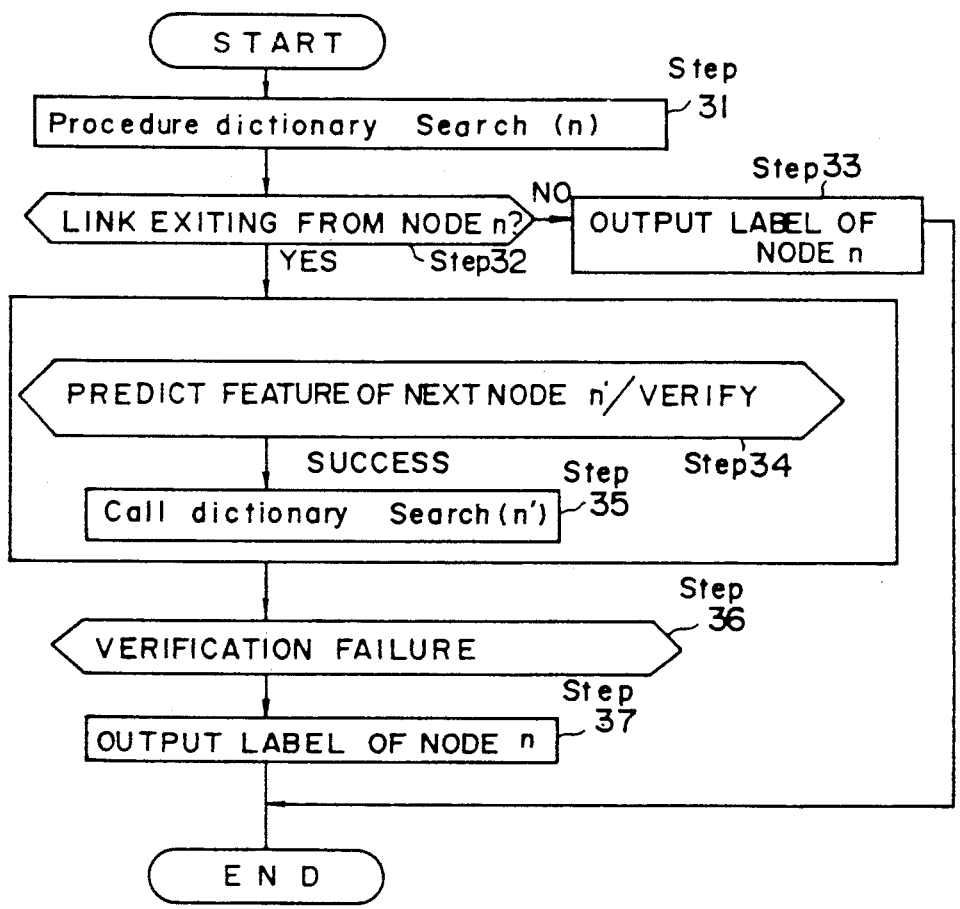
FIG. 3 is a flowchart showing a process of hypothesis verification performed in the process of FIG. 1.

FIG. 3 shows a flowchart of the operation of the hypothesis creation and verification unit 13. In this process shown in FIG. 3, the word recognition unit 12 extracts the line feature from the string of characters forming the word, starting from the left and proceeding to the right under a dialogic interaction with the unit 13. The unit 13, on the other hand, performs a search of the characters stored in the dictionary 14 starting from the root 200 toward the downstream end of the graph along the link. Thereby, verification is made with respect to the existence of the feature, which existence is predicted by the hypothesis, starting from a simple feature and increasing the number of lines in the feature. This procedure is repeated for each of the characters in the word from the left to the right. Hereinafter, an example of the foregoing process will be described with reference to the example of FIG. 4 showing an exemplary word "Linking".

Figure 4:
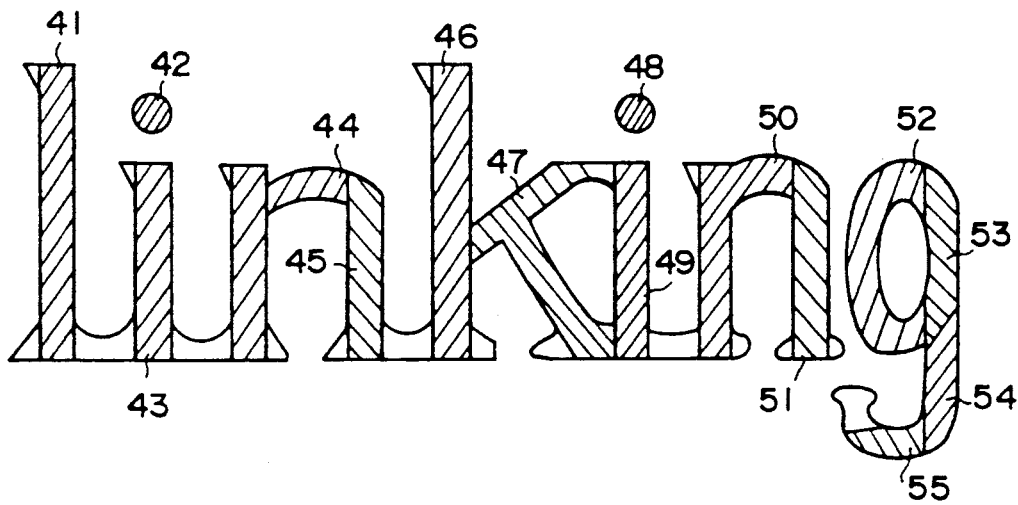
FIG. 4 is a diagram showing an example of the character recognition process according to the first embodiment of the present invention.

Referring to FIG. 3, at the beginning of the process, the word recognition unit 12 extracts a graphic image 41 at the left end of the word shown in FIG. 4. In response thereto, the hypothesis creation and verification unit 13 starts the searching process of the features stored in the dictionary 14, beginning from the root 200 in a step 31. It should be noted that the number n indicating the node in the dictionary 14 is set to 200. In a step 32 following thereto, a discrimination is made whether there is a link exiting from the node 200 or not. As the node 200 has links extending therefrom as shown in FIG. 2, the process proceeds to a step 34 and a verification is made for each of the nodes 201-204 at the end of the links extending from the node 200 whether the predicted feature exists or not.

In the case of the graphic image 41, it is recognized that the feature of the graphic image 41 agrees to the feature of the node 201 having the label "1". Thus, the process of hypothesis verification in the step 34 is made successfully. In response to the success in the step 34, a step 35 is performed for the prediction and verification of the hypothesis with respect to the nodes 205-207, using the node 201 as the next origin. As the graphic image 41 consists of a single vertical bar, the search of the characters corresponding to the nodes 205-207 in the dictionary ends up as failing even in combination with the next graphic images 42 and 43. In response to this result in the step 36, the unit 13 outputs a label "1" indicating the node 201, and at the same time prompts the extraction of the next feature.

Next, the word recognition unit 12 shifts the location of recognition to the right of the graphic image 41 and extracts the features for the graphic images 42 and 43 while calling the hypothesis verification and verification unit 13. The unit 13, in response thereto, performs the process described previously, starting from the step 31. As a result of the process by the unit 13, the graphics 42 and 43 are reconginzed as "i".

Next, the recognition of the character is shifted to the right of the graphic images 42 and 43. In this case, it is confirmed that the graphic image 44 has a feature of the node 203 having the label "r", and with a further search in the dictionary along the link exiting from the node 203, it is confirmed that this feature, corresponding to the label "n" of the next node 209, agrees to the feature of a graphic image which is a combination of the graphic images 44 and 45. On the other hand, further search of the node 212 having the label "m" following the node 203 ends up as failing, as there is no feature in the graphic images 44 and 45 which corresponds to the node 203. Thus, the graphic images 44 and 45 are recognized as representing the character "n".

By repeating the process described heretofore, the string of characters or the word of FIG. 4 is recognized as "linking".

Next, a second embodiment of the present invention will be described with reference to FIGS. 5-11.

Referring to FIG. 5 showing a block diagram of a character recognition system employed in the second embodiment of the present invention, the character recognition system comprises a document reading unit 61 for reading a document printed or hand-written on a sheet with alphanumeric characters and for producing an output as a binary image, a character feature extraction unit 62 for extracting the feature or structural elements forming the character by scanning the binary image of the document read by the unit 61 staring from the left and proceeding to the right, a matching processing unit 63 supplied with an output of the unit 62 indicating the extracted structural element for performing a structural matching consecutively, starting from the left of the binary image while referring to a dictionary 64 for recognition of the characters. The dictionary 64 stores a number of characters as a directed network or classification network which comprises a number of nodes each representing a relational graph of a corresponding character identical to the one already described with reference to the first embodiment and a number of links connecting the nodes, wherein each of the links carries a structural element of the character which represents the structural distinction between the characters forming the nodes. The relational graph forming the nodes of the directed network, in turn, comprises a number of nodes referred to hereinafter as sub-nodes constituted by the structural elements forming the character corresponding to the node of the directed network as well as a number of links referred to hereinafter as sub-links connecting the sub-nodes for representing the positional relationship between the sub-nodes forming the structural element of a character. Each of the sub-nodes and each of the sub-links carry a corresponding attribute representing the geometrical nature of the node or the link.

Next, the network representation of the characters in the dictionary 64 will be described.

When storing the characters in the dictionary, each of the characters is separated into a number of structural elements forming the character as already described with reference to the first embodiment, and these structural elements are arranged into a relational graph using each of the structural elements as the node. As already defined previously, this node is referred to as the sub-node in order to distinguish from the node which forms the node of the directed network which will be described later in detail. Each of the sub-nodes, representing the structural element of the character, has an attribute such as a line segment, arc or isolated point, and is characterized by a stochastic quantity such as an average vector or covariance matrix representing the curvature, length, angle, or the coordinate of these structural elements. Further, the sub-nodes are connected to each other by one or more sub-links each carrying an attribute which represents the connection between the structural elements, geometrical similarlity between the structural elements, and the like.

FIG. 6A shows an example of such a relational graph representing a character "K" while FIG. 6B shows another example representing a character "B". In these drawings, only the sub-nodes and the sub-links are represented and the representation of the attribute is omitted. For example, the character K is formed from sub-nodes 601-604 and the sub-links connecting therebetween, while the character B is formed from sub-nodes 605-613 and the sub-links connecting therebetween.

These relational graphs are arranged further to form a directed network wherein each of the nodes forming the directed network is formed from the relational graph which in turn comprises a number of sub-nodes connected by the sub-links, and the nodes are connected by the links which describe the common features and distinct features between adjacent nodes connected by the link. The fundamental element of the directed network is thus represented as

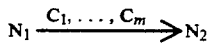

wherein $N_1$ and $N_2$ represent the characters or parts of the characters represented by the relational graphs, and $C_1, \ldots, C_m$ represent the structural elements included in the node $N_2$ but not included in the node $N_1$. In other words, the relational graph corresponding to the node $N_1$ is included in the relational graph corresponding to the node $N_2$, and the node $N_2$ can be derived by adding the structural elements (sub-nodes) $C_1-C_m$ as well as corresponding links (sub-links) to the relational graph of the node $N_1$.

Figure 7A:
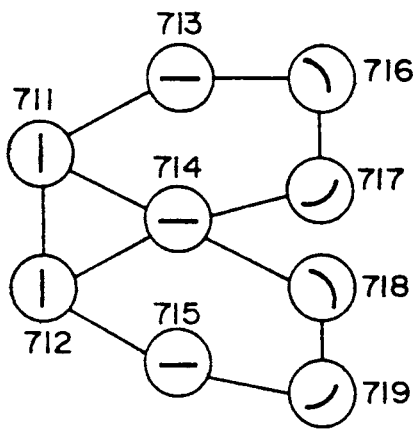
FIGS. 7A through 7D are diagrams showing another example of the relational graph and a directed network for classifying the characters.
Figure 7B:
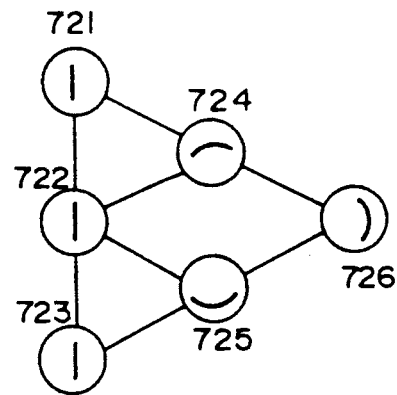

As described heretofore, the graphs stored in the dictionary 64 comprise graphs representing various structural elements forming the character images and the directed networks representing the relationship between the structural elements for constructing the characters. FIGS. 7A and 7B show typical examples of these graphs forming the structural elements while FIGS. 7C and 7D represent the directed network formed by the graphs of FIGS. 7A and 7B.

Figure 7C:
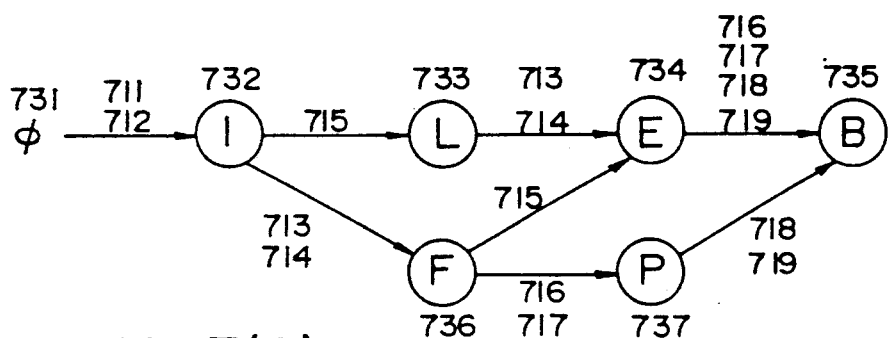

Referring to FIG. 7C, the directed network comprises a root 731 from which a node 732 is derived by links 711 and 712, which links correspond to the sub-nodes 711 and 712 of the character image of FIG. 7A. As the sub-nodes 711 and 712 represent short bars aligned vertically, the node 732 of the network of FIG. 7C derived from the root 731 by the links 711 and 712 is identified to be a letter "l" or a letter including the feature of the letter "l". The node 732 representing the letter "l" in turn is connected to nodes 733 and 736 respectively by a link 715 and links 713 and 714. It should be noted that the link 715 represents a horizontal bar located at a bottom part of the character (FIG. 7A), and thus the character corresponding to the node 733 derived from the node 732 by the link 715 is identified to be the letter "L" or a letter including the feature of the letter "L". On the other hand, the node 736, derived from the node 732 by the links 713 and 714 representing respectively horizontal bars located at top and medium levels of the character (FIG. 7A), is identified to be the letter "F" or a letter including the feature of the letter "F". By the procedure of increasing the features corresponding to the links to each of the nodes, the letters L, E, B, F, P are derived sequentially as illustrated.

Figure 7D:
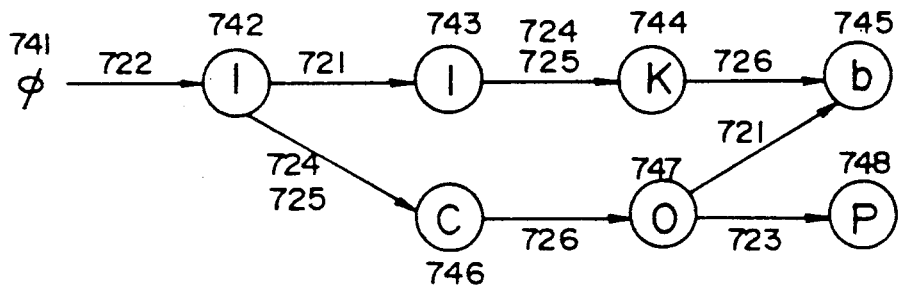

In the case of FIG. 7D, a node 742 derived from a root 741 by a link 722 is identified to be a vertical bar. From this node 742, a next node 743 is derived by a link 721 representing a vertical bar at the high level position of the character, and thus the character at the node 743 is identified to be the letter "I" or a letter which includes the feature of the letter "I". On the other hand, the node 742 is connected to a next node 746 by links 724 and 725 shown in FIG. 7B, and thus, the node 746 is identified to be the letter "C" or a letter including the feature of the letter C. By repeating similar processes, the nodes following thereto are derived. As will be understood from FIGS. 7C and 7D, the links connecting the nodes in the directed network representing the structural elements of the characters represent the difference between the nodes.

Next, the foregoing operation of the matching processing unit 63 will be described with reference to the flowchart of FIG. 11.

In the matching processing unit 63, a search is started for the character along the directed network, starting from a root such as the root 731 or 741 while regarding the network as a state transition chart. In this search, an examination is made for each link connecting one node $N_1$ to a next node $N_2$ as to whether there exists a feature or features satisfying the attribute of the structural elements $C_i-C_m$ which corresponds to the link, in the character image detected by the unit 62, and whether such a correspondence of the structural elements holds for each of the links extending from the root to the node $N_1$. Only when the foregoing conditions are met, is the transition from the node $N_1$ to the node $N_2$ allowed. The foregoing process is repeated until there is no link along which the transition is possible.

In the following, the foregoing process will be described in detail regarding the case of reading a character shown in FIG. 8 together with reference to FIG. 7C.

In a first step starting from the node 731 corresponding to the root of the network, it is examined whether there exists a structural element or elements corresponding to the element 711 or 712 upon transition from the node 731 to the node 732. In the case of the character shown in FIG. 8, there exist line segments 804 and 808 respectively corresponding to the elements 711 and 712. In response to this, the character of FIG. 8 is recognized as a letter "l".

Next, the matching processing unit 63 performs a matching with respect to the transition from the node 732 to the node 733. In this step, it is recognized that there exists a line segment 810 in the character of FIG. 8 in correspondence to the element 715 for the link connecting the node 732 and the node 733. Thereby, the character of FIG. 8 is recognized as a letter "L". Similarly, it is recognized that there exists a line segment 802 in correspondence to the element 713, a line segment 805 in correspondence to the element 714, a line segment 803 in correspondence to the element 716 and a line segment 811 in correspondence to the element 719. On the other hand, the existence of the line segments corresponding to the elements 717 or 718 is not confirmed. Thereby, the search is finished at the node 734 and the character image of FIG. 8 is recognized to be either a letter "l", a letter "L", a letter "E", or a letter "F".

In the case of recognizing a character string read from a document, the foregoing process is repeated while shifting the character to be recognized in the string from the left to the right. FIG. 9 shows an example of the character string, and FIG. 10 shows a process for recognizing the character string.

Referring to FIG. 10 which is arranged into a network, each node represents the result of recognition of the characters performed up to this node, and the further progress of the character recognition to the right along the string is represented as a transition of state. It should be noted that the candidate character which is predicted at the location at which the recognition is to be made, is dependent on the result of recognition which has been made previously for the characters at the left side of this location. In the present embodiment, a loss function L(Si, Sj) is calculated for each of the transitions from one state Si to the next state Sj as a sum of the line segments in the observed character image which do not correspond to any of the structural elements in the dictionary 64, and a transition sequence which minimizes the total loss function g of the loss function L in an interval [SiXmax, SjXmax] is selected. Herein, SiXmax and SjXmax respectively represent the maximum of the x-coordinate of the line segments which are matched in the state Si and in the state Sj. According to this process, the character string of FIG. 9 is recognized as "prospectu", "pmspectu", ... in this order of certainty, and the character image pattern of FIG. 8 is recognized as "E", "F", "L", ... in this order of certainty.

Figure 11:
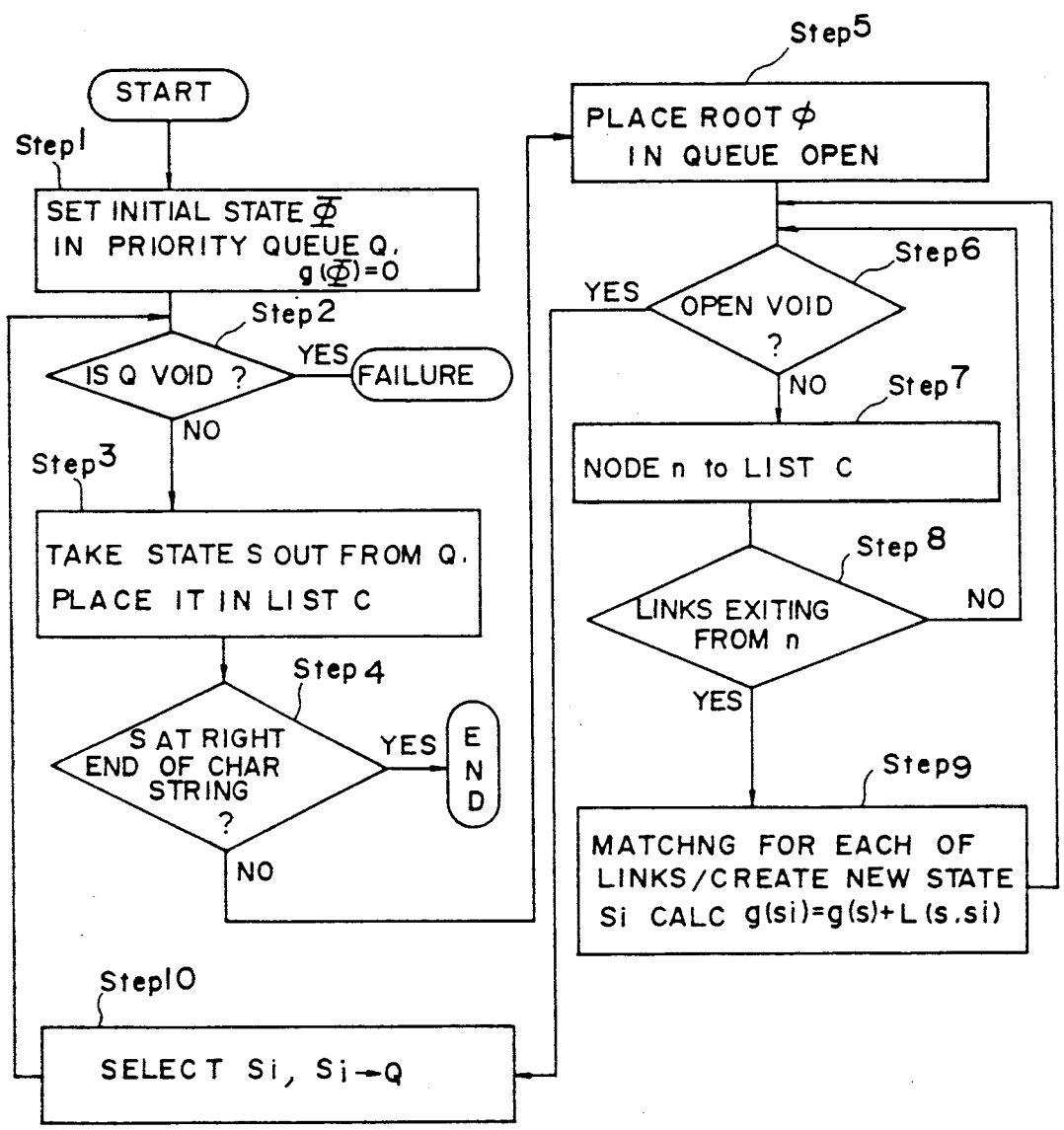
FIG. 11 is a flowchart showing a process of matching analysis performed by the system of FIG. 5.

FIG. 11 shows the foregoing process of character recognition in the form of a flowchart.

Referring to FIG. 11, in a first step 1, an initail state represented as Φ in FIG. 10 is stored in a priority queue Q comprising a queue of states, and the total loss function g is cleared to be zero. It should be noted that each state represents a character included in the character string to be recognized. At the beginning, the initial state Φ is set as already described. After a confirmation that the priority queue Q is not void in a step 2, a state S which provides the minimum of the total loss function g is selected from the queue Q, and this state is placed in a list C for listing candidates of the character string in a step 3. Immediately after starting, the state S comprises the initial state Φ. Next, in a step 4, a discrimination is made whether the state S corresponds to the left end of the character string or not. Immediately after the start of the process, the result of the step 4 is NO, and a step 5 is performed wherein the root φ of the directed network shown in FIGS. 7C and 7D is set in a queue OPEN.

In a step 6, it is discriminated whether the queue OPEN is void or not, and if not, the first node n on the queue OPEN is listed in a list CLOSED in a step 7. When the step 7 is to be performed for the first time after the start in the step 1, the root φ is listed in the list CLOSED. Next, is a step 8, a discrimination is made whether there is a link exiting from the node n. If the result is YES, identification is made, for each of the links exiting from the node n, with respect to the structural elements associated with the node, and further with respect to the conformity of the previous results with respect to the foregoing structural elements which have been matched in the process from the initial state Φ to the state S when there are already in the state S in the queue Q.

When the check for the foregoing conformity is cleared, the node or nodes directed by the link or links are set in the queue OPEN and one or more new states Si are formed. Further, the total loss function g is calculated for each of the states Si as g(Si)=g(S)+L(S, Si), where L(S, Si) represents the loss function associated with the transition from the state S to the state Si.

Next, the process returns to the step 6 wherein the discrimination process for the queue OPEN is repeated. If the result is NO, the steps 7-9 are repeated while proceeding to the next node in the step 7. When the result is YES in the step 6, the state or states which provide a small total loss function g is combined with the state or states already in the priority queue Q, and the state or states which provide a decrease in the total loss function g upon combination, are set in the priority queue Q. Immediately after starting the process at the step 1, in other words when the step 10 is to be performed for the first time after the start of the process, the state in the list Q is the initial state Φ, and thus, one or more states Si obtained in the step 9, are set in the list Q. After the step 10, the step 2 and the steps following thereto are repeated.

Each time the step 3 is performed, the state S providing the minimum value for the total loss function g is selected and is placed in the list C. Thereby, the candidate character string having the reduced total loss function g is preferentially formed in the list C. As a result, the creation of numerous candidate character strings which are irrelevant to the character string to be recognized is avoided and the time needed for the character recognition can be reduced.

Further, the present invention is not limited to the embodiments described heretofore, but various variations and modifications may be made without departing from the scope of the invention.

What is claimed is:

1. A method for recognizing a character string comprising one or more alphanumeric characters read from a document, said character string being defined by a first end and a second end, each of the alphanumeric characters comprising a plurality of structural elements disposed with a predetermined geometrical relationship so as to form the alphanumeric character, said method comprising the processes of:
   (a) providing a dictionary having each alphanumeric character stored as a graph, the graph comprising nodes and links connecting the nodes;
      (1) each of the nodes corresponding to one of the structural elements and carrying an attribute representative thereof; and
      (2) each of the links representing the geometrical relationship which exists between the nodes which are connected by the link;
   (b) reading a character string from a document;
   (c) extracting one or more structural elements and a geometrical relationship existing therebetween from the character string read from the document, starting from a starting location of character recognition at the first end of the character string and proceeding consecutively to the second end of the character string;
   (d) verifying that the structural elements and the geometrical relationship extracted in the process of extraction exist in the dictionary, wherein said step of verifying includes searching the dictionary:
      (1) starting from a simple alphanumeric character having a small number of structural elements; and
      (2) proceeding to complex alphanumeric characters having a large number of structural elements;
   (e) predicting the structural elements and the geometrical relationship existing in the character string at a location immediately adjacent to the former location in the character string, based on the result of the process of verification, by assuming a candidate character; and (f) recognizing the character string by moving the location step by step consecutively along the character string towards the second end, while repeatedly performing the processes of extraction, verification, and prediction in each of the steps.

2. A method as claimed in claim 1 in which said character string is defined by a left end and a right end respectively in correspondence to the first end and the second end, and said process of recognition is performed while moving by step, consecutively from the left end of the character string to the right end of the character string.

3. A method as claimed in claim 1 in which said dictionary stores the characters as a plurality of graphs each corresponding to a character, said plurality of graphs being arranged into a network comprising a plurality of network nodes and a plurality of directed network links connecting the network nodes, wherein each of said network nodes indicated by the directed network link, exiting from a previous network node, inlcudes all of the structural elements of the character corresponding to the previous network node, and each of the network links connecting the network nodes represents the difference between the characters corresponding to the network nodes connected by the network link.

4. A method as claimed in claim 3 in which said processes of extraction, verification, and prediction are performed along the directed network links, starting from an initial state.

5. A method as claimed in claim 4 in which said process of recognition comprises a process of evaluating a loss function indicative of failure of recognition each time the location of character recognition process for recognizing the character string moves one step, and a process of selecting the character string which minimizes the loss function.

* * * * *